United States Patent [19]
Collins et al.

[11] Patent Number: 4,827,504
[45] Date of Patent: May 2, 1989

[54] NETWORK INTERFACE ENCLOSURE

[75] Inventors: Thomas J. Collins, Wall; Thomas G. Graham, Ocean, both of N.J.

[73] Assignee: Keptel, Inc., Tinton Falls, N.J.

[21] Appl. No.: 21,475

[22] Filed: Mar. 4, 1987

[51] Int. Cl.$^4$ .............................................. H04M 9/00
[52] U.S. Cl. ................... 379/399; 361/356; 248/231
[58] Field of Search .................. 379/399, 412, 442; 220/324, 3.8, 327; 248/230, 231; 361/356, 427; D 14/52; D 13/40, 13, 30; 292/87, DIG. 38, 206

[56] References Cited

U.S. PATENT DOCUMENTS

| | | | |
|---|---|---|---|
| D. 275,667 | 9/1984 | Dellinger et al. | D13/30 |
| D. 287,583 | 1/1987 | Smith et al. | D13/40 X |
| 3,517,853 | 6/1970 | Aikens | 220/324 |
| 3,828,969 | 8/1974 | Schurman | 220/324 |
| 3,868,080 | 2/1975 | Olson | 248/231 X |
| 4,213,013 | 7/1980 | Perna et al. | |
| 4,303,296 | 12/1981 | Spaulding | |
| 4,438,477 | 3/1984 | Cawley | 361/111 |
| 4,488,008 | 12/1984 | Dellinger et al. | |
| 4,500,158 | 2/1985 | Dola | |
| 4,560,839 | 12/1985 | Dillard | 379/399 |
| 4,624,514 | 11/1986 | Smith | 379/412 |
| 4,658,422 | 4/1987 | Sparks | 379/442 |
| 4,741,032 | 4/1988 | Hampton | 379/399 |

FOREIGN PATENT DOCUMENTS 2007671 9/1971 Fed. Rep. of Germany ...... 220/324

OTHER PUBLICATIONS

TII Network Interface advertisement from Mar. of 1983.
TII brochure re TII 755, 756, & 757, Network Interface Devices.
Sylvania brochure re CP800 Network Interface Device.
AT&T brochure re the 200 Network Interface Unit.
AT&T brochure re Network Terminating Systems.
General Cable Co. brochure re SPD$_2$ Network Interface.
Northern Telecom brochure for Multifunction protector.
Siecor product brochure re CAC 1000 Network Interface.

(List continued on next page.)

Primary Examiner—Jin F. Ng
Assistant Examiner—Randall S. Vaas
Attorney, Agent, or Firm—R. Gale Rhodes, Jr.

[57] ABSTRACT

A telephone network interface enclosure adapted to interconnect incoming telephone wiring to subscriber premises wiring. The device, according to one embodiment, comprises a base having a wall circumscribing a bottom portion of the base; the base having a first area containing first electrical terminals adapted to be connected to subscriber premises wiring and the base having a second area containing second electrical terminals adapted to be connected to incoming telephone wiring; a first cover covering the entirety of the base, the first cover being exposed to the exterior; a second cover disposed beneath the first cover, the second cover only enclosing the second area of the base; a cable coupled to the first terminals and located in the first area of the base, the cable including a plug at an end of the cable means distant from the first terminals; a jack means located in the first area of the base and adapted to receive the plug means, the jack means being electrically connected to the second terminals; the first cover removably fastened to the second cover by a first fastener; the first fastener comprising a deformable clip; the second cover removably fastened to the base by a second fastener, whereby the first fastener may be undone to open only the first cover to allow access to the first area of the base only and the second fastener may be undone to allow both the first and second covers to be opened as a unit, allowing complete access to the interior of the base. In another embodiment, a third fastener is used in addition to the first fastener for removably coupling the first and second covers.

7 Claims, 6 Drawing Sheets

OTHER PUBLICATIONS

AMP brochure for NID Connector (See USPN 4,500,158 to Dola, above).
Lippincott brochure for GL 500 Network Interface Device.
Reliance Comm/Tec, Product Brochure.
GTE Sylvania Product Drawing (2 pages).
TII Industries, Inc., Product Brochure.
BEJED Product Brochure.
Northern Telecom Product Brochure.
AMP, Inc., Product Drawing.
Lippincott Ind. Inc. Product Brochure.
AT&T Product Brochure.
GTE Sylvania Product Brochure (2 pages).
Lippincott Ind. Inc. Product Brochure.
Siecor CAC Equipment Product Brochure (2 pages).
Keptel SNI-2200 Brochure, two lines or one.
Keptel SNI-2200 Brochure, SNI-2200 features, single/dual line Network Interface Housing, 6/1984.
Keptel SNI-9400 Brochure Modular Solution.
Keptel SNI-5000 Brochure, Tomorrow's Network Interface System . . . Today.
Keptel SNI-1100—Installation Data.

NETWORK INTERFACE ENCLOSURE

CROSS REFERENCE TO RELATED APPLICATIONS

This application is related to U.S. application Ser. No. 879,940, filed June 30, 1986, in the names of Thomas J. Collins, Donald C. Stier, and Thomas G. Graham, and U.S. application Ser. No. 834,736, filed Feb. 28, 1986, in the names of Thomas J. Collins and Pina Schneider. Both of the above-referenced applications are commonly owned by the assignee of this application.

BACKGROUND OF THE INVENTION

As do the inventions in the above-identified related applications, the present invention concerns network interface enclosures for connecting incoming telephone lines to subscriber-owned telephone wiring located on the subscriber's premises.

Deregulation of the telephone industry has necessitated a clearly defined demarcation point between the incoming telephone lines and the subscriber-owned wiring located on te subscriber's premises. One reason for this is that it is important to be able to quickly and efficiently determine whether problems in telephone wiring exist in the telephone company owned portion of the wiring or in the subscriber's house wiring, since defects or faults in the subscriber's house wiring generally are the responsibility of the subscriber and not the telephone company. Accordingly, it is convenient to provide an interface device which allows for interconnection of the telephone company owned wiring and the subscriber premises wiring and which also allows the subscriber or telephone company personnel to make a determination whether a fault exists in the subscriber wiring or in the telephone company owned wiring when a problem arises. Furthermore, the interface device provides a convenient location for disposition of telephone line testing equipment, such as maintenance termination units (MTU's), protective equipment such as lightning arresters or other specialized electronics (e.g., party line electronics).

Various arrangements for solving this problem have been proposed and a number of competitive devices for achieving this end have been developed. For example, see U.S. application Ser. No. Des. 518,410, now U.S. Pat. No. Des. D-282,654, commonly owned by the assignee of the present application. Also see U.S. Pat. Nos. 4,488,008 and 4,500,158 for other examples.

SUMMARY OF THE INVENTION

It is an object of the present invention to provide a network interface enclosure for interconnecting telephone company wiring and subscriber premises wiring.

It is furthermore an object of the present invention to provide such a network interface enclosure which allows a subscriber to access only those terminals to which the subscriber premises wiring is connected and which prevents access to the telephone company terminal side.

It is furthermore an object of the present invention to provide a network interface enclosure for telephone lines which allows a subscriber or telephone company personnel to quickly determine, in the event of a fault, whether the fault exists in the subscriber premises wiring or in the telephone company lines coupled to the network interface enclosure.

It is yet another object of this invention to provide a telephone network interface enclosure which utilizes two access covers, the first access cover being exposed to the exterior and the second access cover, a "floating" cover, disposed beneath the first cover. When both access covers are closed, both the terminals to which the subscriber premises wiring and the terminals to which the incoming telephone lines are connected are enclosed. By opening the first or subscriber access cover, a subscriber obtains access only to the terminals connected to the subscriber premises wiring and does not obtain access to the terminals connected to the incoming telephone lines.

It is yet a further object of the present invention to provide a network interface enclosure which allows telephone company personnel, through the unfastening of a single fastener, to obtain quick and complete access to the interior of the enclosure, including access to both the telephone company line connected terminals and the subscriber premises wiring terminals.

It is a further object of the present invention to provide a convenient enclosure for telephone line testing equipment, protective equipment, telephone line special electronics, etc.

These and other objects are achieved according to one aspect of the present invention by a network interface enclosure adapted to interconnect incoming telephone wiring to subscriber premises wiring comprising a base having a wall circumscribing a bottom portion of the base; said base having a first area containing first electrical terminals adapted to be connected to subscriber premises wiring and said base having a second area containing second electrical terminals adapted to be connected to incoming telephone wiring; a first cover covering the entirety of said base, said first cover being exposed to the exterior; a second cover disposed beneath said first cover, said second cover only enclosing said second area of said base;

cable means coupled to said first terminals and located in said first area of said base, said cable means including a plug means at an end of the cable means distant from said first terminals; jack means located in said first area of said base and adapted to receive said plug means, said jack means being electrically connected to said second terminals; said first cover removably fastened to said second cover by first fastening means; said first fastening means comprising a deformable clip means, and said second cover removably fastened to said base by a second fastening means, whereby said first fastening means may be undone to open only said first cover to allow access to said first area of said base only and said second fastening means may be undone to allow both said first and second covers to be opened, allowing complete access to the interior of said base.

BRIEF DESCRIPTION OF THE DRAWINGS

The invention will be described in greater detail in the following detailed description with reference to the drawings in which.

DETAILED DESCRIPTION OF THE DRAWINGS

Figure 2:
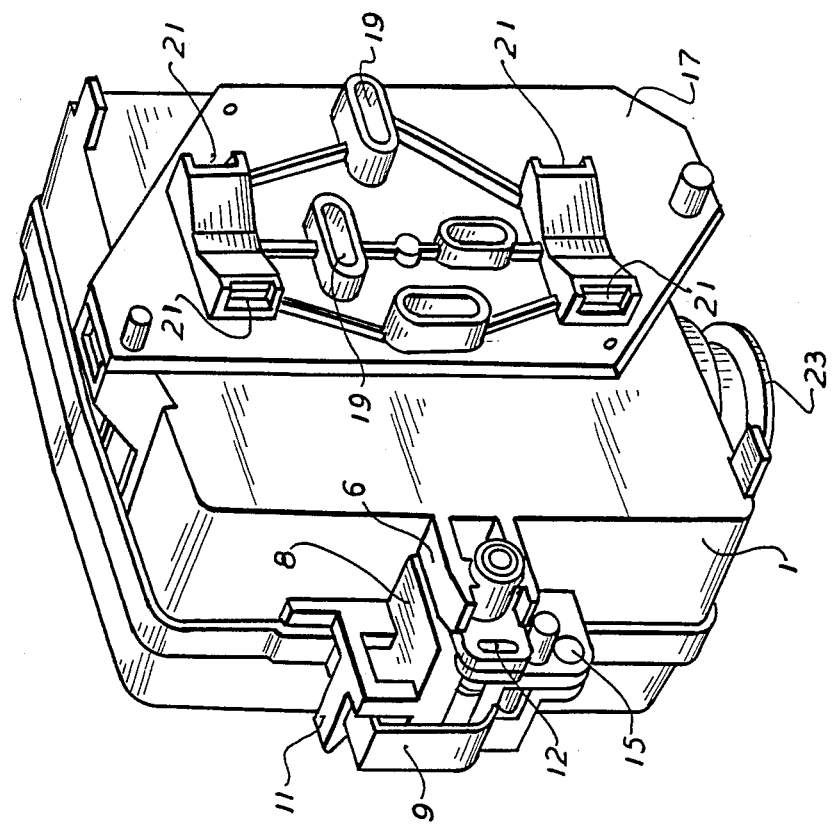
FIG. 2 is a rear perspective view of the network interface enclosure of the present invention showing an auxiliary mounting plate for the network interface enclosure in position.

With reference now to the drawings, the network interface enclosure of the present invention preferably comprises a base 1, a first exterior cover 2, and a second interior cover 3 disposed beneath the first cover 2.

Base 1 preferably is molded in plastic and comprises a bottom portion 1a and a wall 1b circumscribing the bottom portion. Cover 2 is hinged at one edge at 4 and 5 as shown. Cover 3 is a "floating" cover and has no hinges. Floating Cover 3 may be secured to an ear 6 integrally molded to and extending off of base 1, via fastener 7 passing through tab 8 integrally molded to cover 3.

Fastener 7 preferably comprises a special screw and is positioned with respect to tab 8 so that it is not easily removable by a subscriber, requiring a special type of tool with which to remove the fastener, for example, as shown, a special hex head screw deeply set in tab 8.

Figure 9:
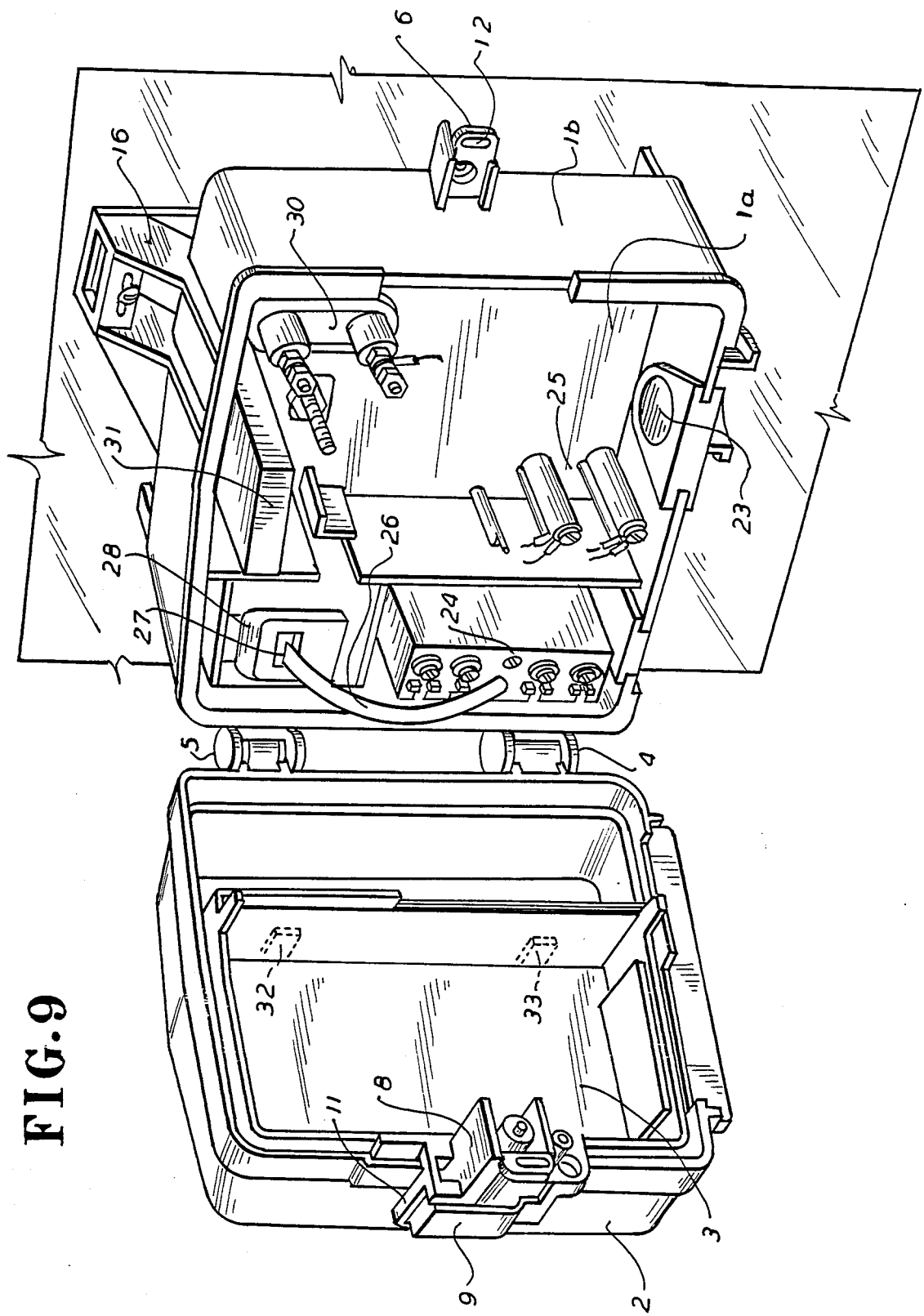
FIG. 9 is a perspective view of the network interface enclosure of the present invention showing the first cover in an open position and the second cover in an open position disposed within the first cover, and revealing the entire interior interface enclosure.

Cover 2 may be secured to cover 3 via a screw 10 passing through tab 9, integrally molded in cover 2, and fastened to tab 8. Cover 2 is also secured to cover 3 via a deformable plastic retaining clip 11 integrally molded in tab 8 which has a tang 11a which cooperates with and snaps on to tab 9, thereby securing floating cover 3 to exterior cover 2. As shown in FIG. 9, tabs 32 and 33, integrally molded in the interior surface of cover 2, serve to assist the retention of cover 3 within cover 2. This arrangement allows for telephone company personnel to access the entire base 1 by unfastening fastener 7 whether or not retaining clip 11 is disengaged and screw 10 is unfastened. When fastener 7 is fastened, subscribers may gain access to only the terminals for the subscriber premises wiring by unfastening screw 10, disengaging retaining clip 11, and opening hinged cover 2.

Ear 6 of base 1 and tab 8 of floating cover 3 contain respective aligned holes 12 and 13, which can be used in addition to fastener 7 to secure cover 3 to base 1 using, for example, a seal to further prevent access to the telephone company terminals. Likewise, tab 9 of exterior cover 2 and tab 8 of floating cover 3 contain respective aligned holes 14 and 15, which can be used by subscribers to padlock the two covers together, to prevent any unauthorized (vandal) access, if desired.

Figure 1:
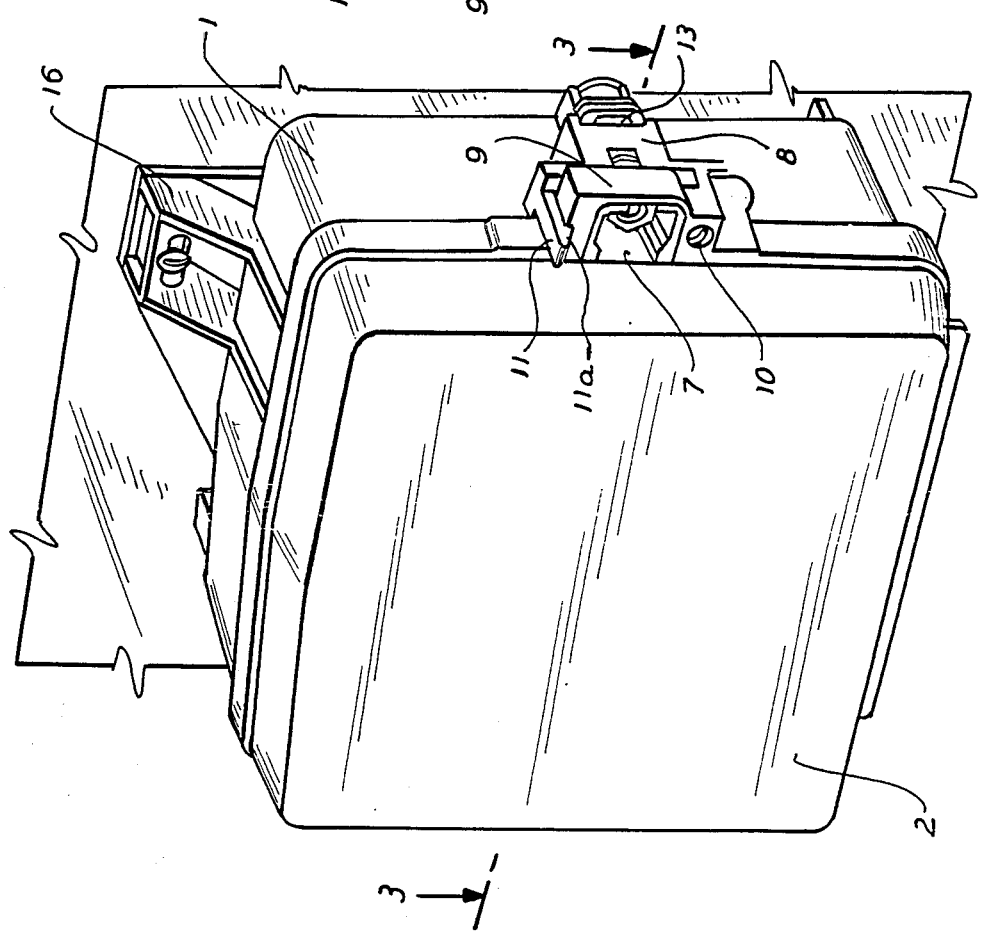
FIG. 1 is a perspective view of the network interface enclosure of the present invention in its closed position.
Figure 6:
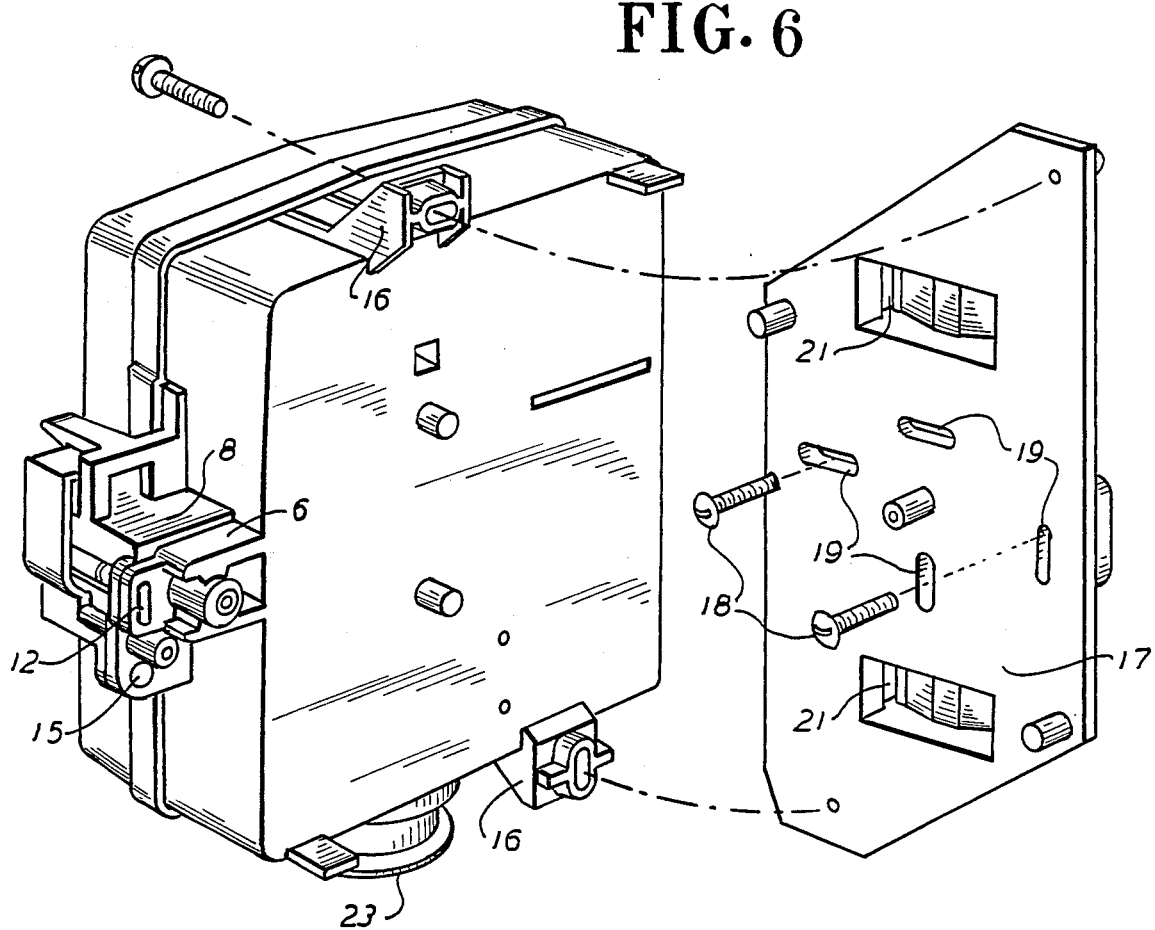
FIG. 6 is a rear perspective view of the network interface enclosure of the present invention showing an auxiliary mounting plate separated from the network interface enclosure.
Figure 3:
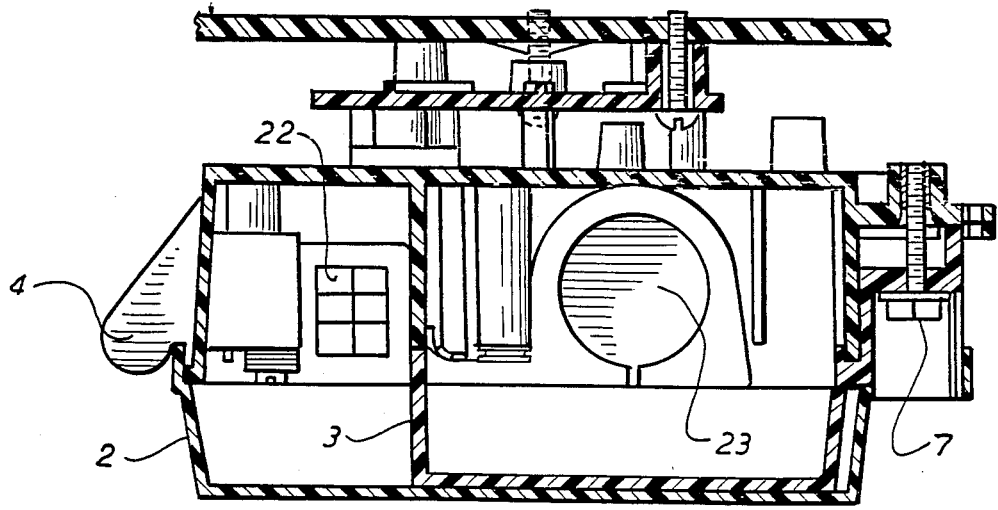
FIG. 3 is a bottom cross-sectional view of the network interface enclosure of the present invention mounted to a surface utilizing the auxiliary mounting plate.
Figure 8:
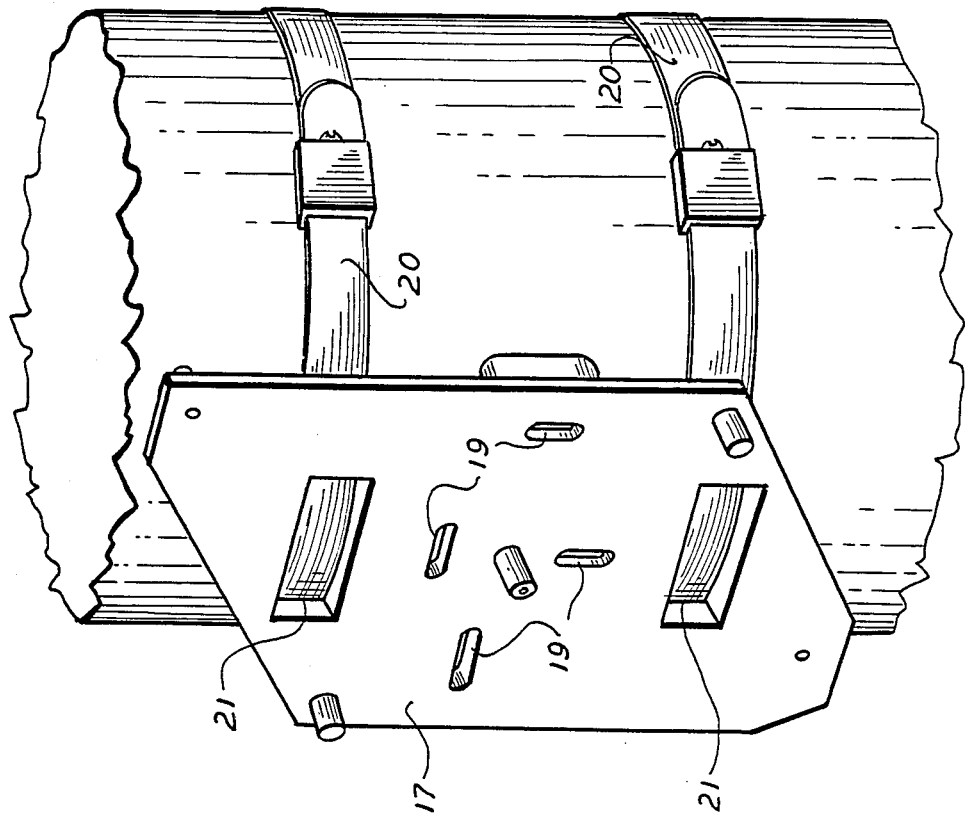
FIG. 8 is a perspective view of the auxiliary mounting plate for the network interface enclosure of the present invention secured to a post with straps or bands.
Figure 7:
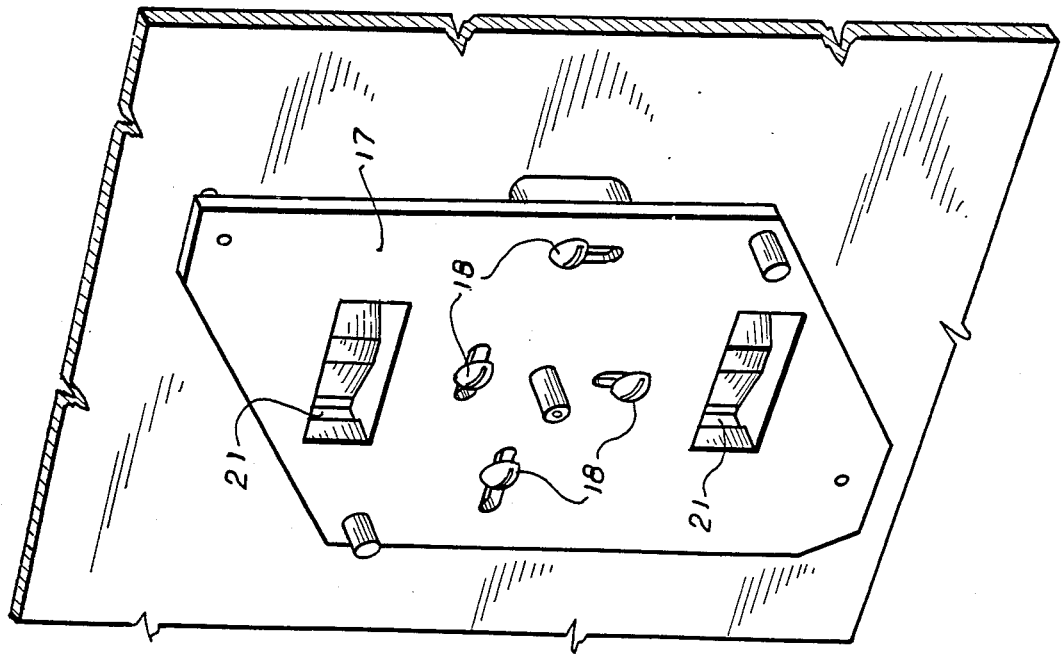
FIG. 7 is a perspective view of the auxiliary mounting plate for the network interface enclosure of the present invention fastened to a surface with screws.

Base 1 also includes mounting ears 16 with which to mount the network interface enclosure, for example to a wall, as shown in FIG. 1, or to a special mounting plate 17 as shown in FIG. 6. Special mounting plate 17 can be secured to a wall by fastening screws 18 passing through openings 19 as shown in FIG. 7. Mounting plate 17 can also be secured to such fixtures as poles via straps 20 passing through elongated openings 21 as shown in FIG. 8.

Base 1 also includes access holes 22 and 23 which may be covered by suitable rubber grommets to provide a weatherproof type of seal. Access hole 22 allows entry of subscriber premises wiring into the network interface enclosure and access hole 23 allows entry of telephone company wiring into the network interface enclosure.

Figure 4:
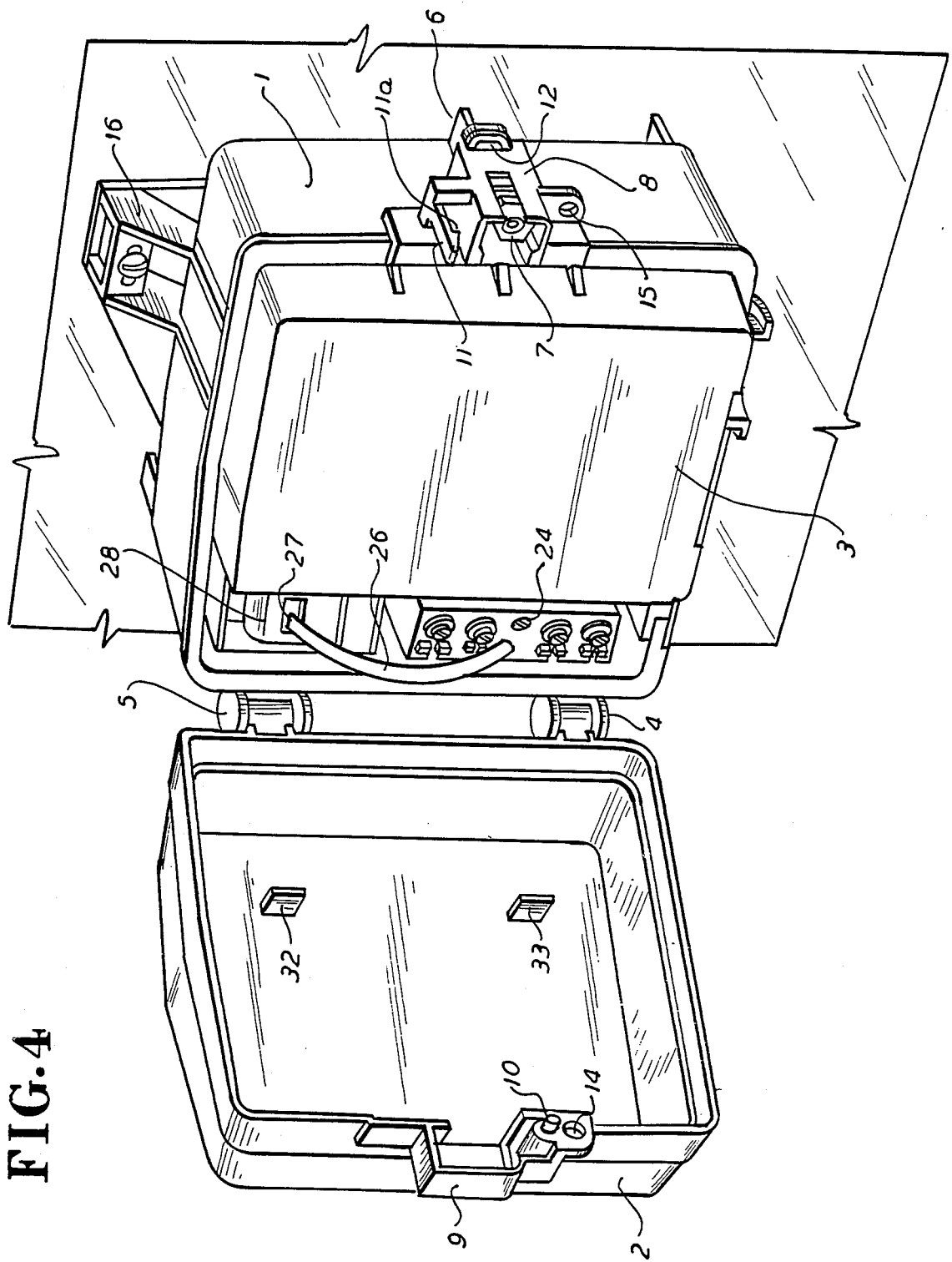
FIG. 4 is a perspective view of the network interface enclosure of the present invention with the first cover in an open position which allows access to the terminals connected to the subscriber's house wiring and the second cover in an attached, closed position.
Figure 5:
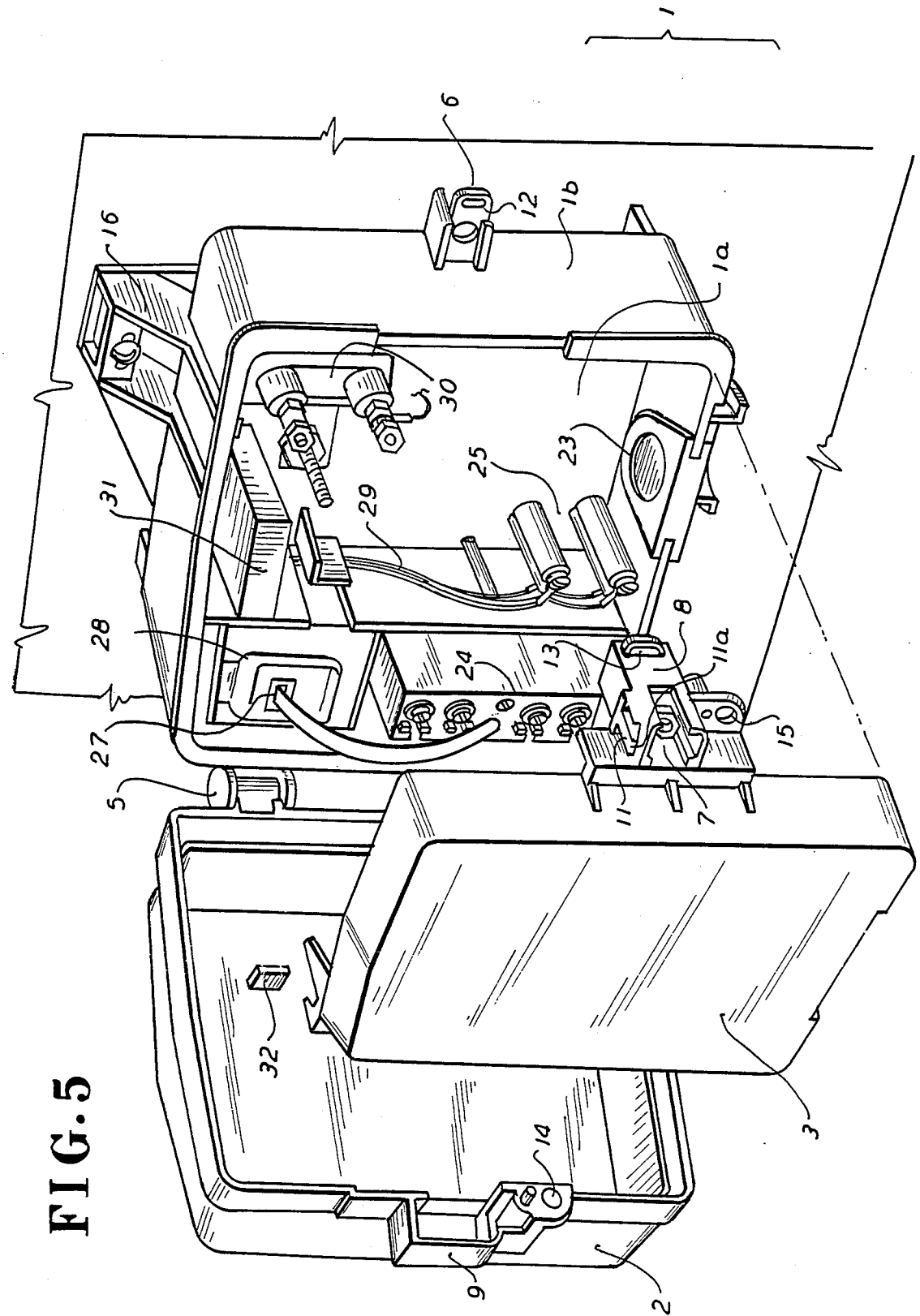
FIG. 5 is a perspective view of the network interface enclosure of the present invention showing the first cover in an open position and the second cover in a detached, open position, revealing the entire interior of the network interface enclosure.

As previously described, a subscriber may obtain access to the subscriber accessible area by opening hinged cover 2 as shown in FIG. 4, thereby obtaining access to the first set of terminals 24; this set of terminals, in the embodiment shown, is coupled to subscriber premises wiring for two different telephone lines. As shown in FIG. 4, by opening cover 2, a subscriber does not obtain access to the telephone company wiring or terminals 25 which are contained in base 1, underneath the portion covered by cover 3, as shown in FIG. 5. Thus, access to terminals 25 can only be obtained by opening cover 3. Terminals 24 and 25 are interconnected via a cable 26, which has a modular plug 27 at one end thereof adapted to be received in a modular jack assembly 28. Suitable conductors 29 interconnect jack assembly 28 with terminals 25.

In order to determine whether a fault exists in the telephone company owned wiring or the subscriber premises wiring, a subscriber (or telephone company personnel) opens cover 2 of the network interface enclosure, leaving cover 3 closed. The subscriber disconnects modular cable 26 from modular jack 28 and connects thereto an operating telephone. If the telephone operates normally then the subscriber can assume that the fault is within the subscriber's own wiring. If the telephone still fails to operate, then the subscriber can assume that the fault exists in the telephone company owned wiring, and appropriate action can be taken (i.e., calling repair personnel).

As shown in FIG. 5, various circuit boards and telephone system circuits and devices can be disposed within the network interface enclosure, for example, lightning protector apparatus 30 and maintenance termination unit (MTU) 31. These devices may, e.g., be disposed in channels or secured to studs integrally molded into base 1.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather then a restrictive sense.

What is claimed is:

1. A telephone network interface enclosure adapted to interconnect incoming telephone wiring to subscriber premises wiring comprising:
   a base having a wall circumscribing a bottom portion of the base; said base having a first area containing first electrical terminals adapted to be connected to subscriber premises wiring and said base having a second area containing second electrical terminals adapted to be connected to incoming telephone wiring;
   a first cover hinged to said base and covering the entirety of said base, said first cover being exposed to the exterior;
   a second floating cover disposed beneath said first cover, said second cover not hinged to said base and only enclosing said second area of said base;
   cable means coupled to said first terminals and located in said first area of said base, said cable means including a plug means at an end of the cable means distant from said first terminals; and
   jack means located in said first are of said base and adapted ro receive said plug means, said jack means being electrically connected to said second terminals;
   said first cover removably fastened to said second cover by first fastening means, said first fastening means comprising a deformable clip means;
   said second cover removably fastened to said base by second fastening means, whereby said first fastening means may be undone to open only said first cover to allow access to said first area of said base only and said second fastening means may be undone to allow both said first and second covers to be opened as a unit, allowing complete access to the interior of said base.

2. The telephone network interface enclosure recited in claim 1, further comprising third fastening means for removably coupling said first and second covers.

3. The telephone network interface enclosure recited in claim 1, further including a region in said second area for receiving telephone line test equipment, protective equipment, or electronic circuit means.

4. The telephone network interface enclosure recited in claim 1, further comprising bracket means adapted to couple said enclosure to a mounting surface.

5. The telephone network interface enclosure recited in claim 4, wherein said bracket includes first aperture means adapted to receive screw fastening means for fastening the bracket to a substantially flat mounting surface and second aperture means adapted to receive strap means for fastening the bracket to a pole-like mounting surface.

6. The telephone network interface enclosure recited in claim 1 wherein said deformable clip means comprises a projecting member integrally molded with said second cover and accessible from the exterior of said enclosure, and further comprising a projecting surface extending from said first cover for receiving a tang molded integrally with said projecting member.

7. The telephone network interface enclosure recited in claim 1, wherein said first cover means includes a tab means disposed on the inner surface thereof for engaging with a surface of said second cover, said surface of said second cover disposed on a side opposite from the side on which said second fastening means is disposed, thereby assisting retention of said second cover within said first cover so that said first and second covers may be opened as a unit.

* * * * *